United States Patent [19]
Schroll

[11] Patent Number: 5,989,318
[45] Date of Patent: Nov. 23, 1999

[54] APPARATUS FOR SEPARATING WATER FROM A TWO-PHASE STREAM

[75] Inventor: Craig Raymond Schroll, Glastonbury, Conn.

[73] Assignee: International Fuel Cells Corporation, South Windsor, Conn.

[21] Appl. No.: 09/081,377

[22] Filed: May 19, 1998

[51] Int. Cl.[6] .................................................. B01D 19/00
[52] U.S. Cl. ........................ 96/6; 95/46; 95/241; 96/155
[58] Field of Search .............................. 95/46, 241; 96/6, 96/155, 193

[56] References Cited

U.S. PATENT DOCUMENTS

| | | | |
|---|---|---|---|
| 3,631,654 | 1/1972 | Riely et al. | 96/6 |
| 3,803,810 | 4/1974 | Rosenberg | 96/6 |
| 4,531,954 | 7/1985 | Klein | 96/6 |
| 5,254,143 | 10/1993 | Anazawa et al. | 96/6 |
| 5,439,587 | 8/1995 | Stankowski et al. | 96/6 |

FOREIGN PATENT DOCUMENTS

| 1318247 | 6/1987 | U.S.S.R. | 96/6 |
|---|---|---|---|

*Primary Examiner*—Duane S. Smith
*Attorney, Agent, or Firm*—McCormick, Paulding & Huber

[57] ABSTRACT

The present invention is directed to a water separator for separating a two-phase stream into a liquid water component and a gas component. The water separator includes a housing defining a cavity and includes an input port, a gas output port and a water output port. A hydrophobic filter is provided in the cavity and interposed between the input port and the gas output port so as to prevent a liquid water component of a two-phase stream of gas and water entering the input port from exiting the gas output port. A hydrophilic filter is provided in the cavity and interposed between the input port and the water output port so as to prevent the gas component entering the input port from exiting the water output port. The gas component separates from the water component by passing through the hydrophobic filter and leaving the separator through the gas output port, and the liquid component separates from the gas component by passing through the hydrophilic filter and leaving the water separator through the water output port.

15 Claims, 1 Drawing Sheet

5,989,318

APPARATUS FOR SEPARATING WATER FROM A TWO-PHASE STREAM

FIELD OF THE INVENTION

The present invention relates generally to a static water separator, and more particularly to an apparatus for separating water from the gaseous reactant exhaust of a fuel cell.

BACKGROUND OF THE INVENTION

A fuel cell power plant must manage its product water. This is normally accomplished by evaporative removal or entrainment from the cell stack assembly (CSA) by one or both of the fuel and oxidant reactant vent streams. The product water that is produced by the chemical reaction between hydrogen in the fuel reactant and oxygen in the process oxidant reactant is then typically passed on to a downstream condenser/sump where the product water is collected and stored for disposition within or outside the fuel cell system.

Land based fuel cell power plants employ gravity to separate its product water from the gaseous reactant exhaust. Power plants located in space and operating in a zero-gravity environment separate the water by centrifugal means. Centrifugal separation is accomplished by a high rotational speed pump/separator which has inherent high frequency noise and high energy torque associated with its operation. A drawback with the above-mentioned separation methods is that they are not suitable for underwater, space or terrestrial applications where gravity and/or attitude independence, low rotational torque and stealth are imposed simultaneously.

In response to the foregoing, it is an object of the present invention to provide a static water separator which overcomes the drawbacks and disadvantages of prior water separator systems. Other objects and advantages of this invention will become more readily apparent when the following description is read in conjunction with the accompanying drawings.

SUMMARY OF THE INVENTION

The present invention is directed to a water separator for separating a two-phase stream into a liquid water component and a gas component. The water separator includes a housing defining a cavity and includes an input port, a gas output port and a water output port. A hydrophobic filter is provided in the cavity and interposed between the input port and the gas output port so as to prevent a liquid water component of a two-phase stream of gas and water entering the input port from exiting the gas output port. The hydrophobic filter permits a gas component of the two-phase stream to be forced therethrough by means of a pressure difference thereacross and to exit the water separator via the gas output port. A hydrophilic filter is provided in the cavity and interposed between the input port and the water output port so as to prevent the gas component entering the input port from exiting the water output port. The hydrophilic filter permits a water component of the two-phase stream to be forced therethrough by means of a pressure difference thereacross and capillary action therein and to exit the water separator via the water output port.

DETAILED DESCRIPTION OF THE PREFERRED EMBODIMENT

Figure 1:
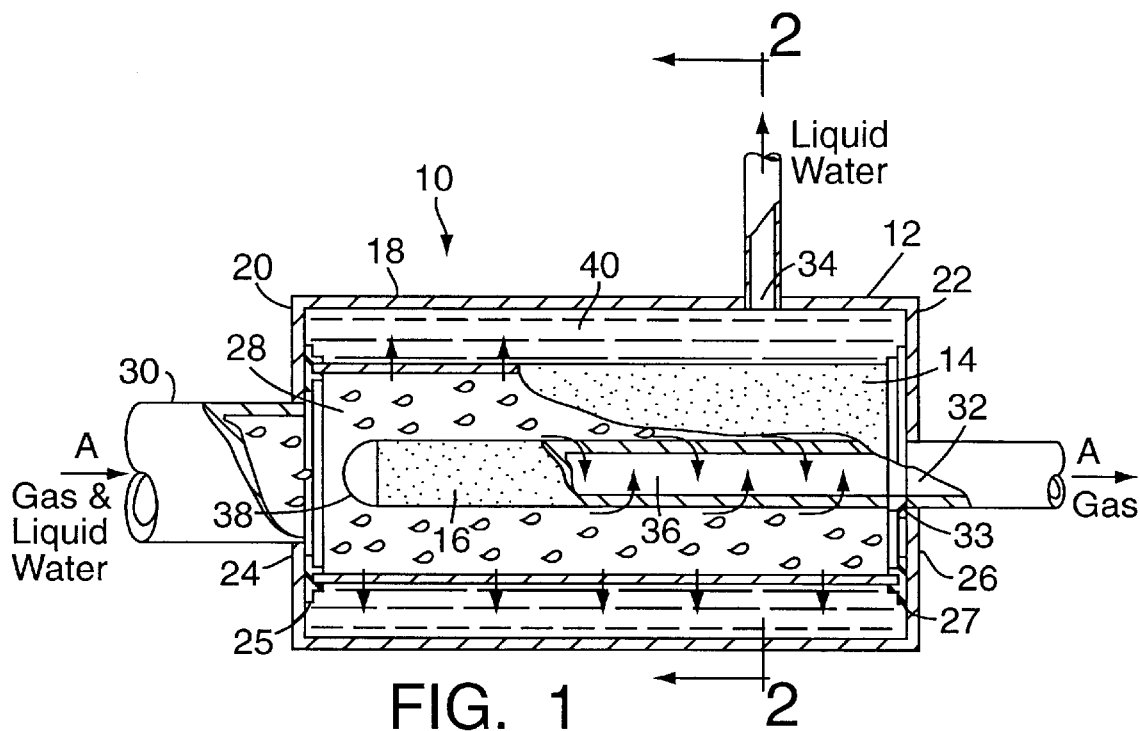
FIG. 1 is a cross-sectional, side elevational view of a static water separator embodying the present invention.
Figure 2:
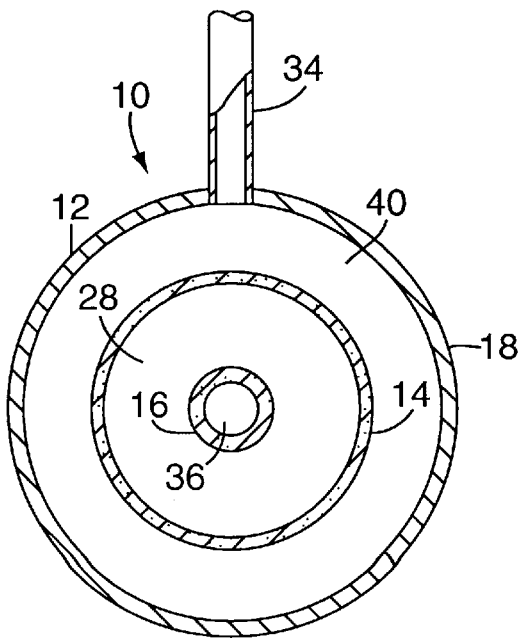
FIG. 2 is a cross-sectional view taken along the line 2—2 in FIG. 1 of the static water separator of FIG. 1.

With reference to FIGS. 1 and 2, a static water separator embodying the present invention is generally designated by the reference number 10. The static water separator separates liquid water and gas components from a two-phase stream issuing, for example, from at least one of the fuel or oxidant reactant vent streams of a fuel cell (not shown).

The separator 10 includes a generally cylindrically-shaped housing 12, a hydrophilic filter 14 and a hydrophobic filter 16. Preferably, the hydrophilic filter 14 and the hydrophobic filter 16 are in the form of thin membranes, as shown in FIGS. 1 and 2, whereby water may easily pass through the hydrophilic filter 14 and gas may easily pass through the hydrophobic filter 16. Several commercially available membranes may be employed for the hydrophilic and hydrophobic filters. A hydrophilic membrane may be formed, for example, from polyethersulfone or an acrylic copolymer on a non-woven nylon support, and preferably has a pore size of about 0.1 $\mu$m to about 0.2 $\mu$m, a thickness of about 4 mils to about 12 mils and a bubble pressure of about 25 psi to about 50 psi. A hydrophobic membrane may be formed, for example, from an acrylic copolymer cast on a non-woven nylon support and post-treated for hydrophobicity through UV/E beam polymerization, and preferably has a pore size of about 0.2 $\mu$m, a thickness of about 6 mils to about 12 mils, a water breakthrough pressure of about 26 psi to about 50 psi, and an airflow rate of, for example, about 7–20 lpm/3.7 cm$^2$ at 13.5 psi or about 4.5–13 lpm/3.7 cm$^2$ at 3.5 psi. As an example, membranes manufactured by Gelman Sciences, of Ann Arbor Mich., and sold under the trademarks "Versapor 200" and "Supor 100" may be employed for the hydrophilic membrane 14, and membranes sold under the trademarks "Versapor 200R" and "Versapor 200H" by the same manufacturer may be employed for the hydrophobic membrane 16.

The housing 12 includes a cylindrical side wall 18 extending circumaxially about a central longitudinal axis A—A, and extending in a longitudinal direction along the axis A—A from a first end 20 to a second end 22. The housing 12 further includes at the first end 20 a generally circular first end wall 24 extending in a plane transverse to the axis A—A, and includes at the second end 22 a generally circular second end wall 26 also extending in a plane transverse to the axis A—A. The side and end walls 18, 24 and 26 of the housing 12 cooperate to define a cavity 28 for housing and supporting the hydrophilic and hydrophobic filters or membranes 14 and 16.

The first end wall 24 defines a first opening or input port 30 for receiving a two-phase stream of liquid water and gas supplied from, for example, a reactant exhaust port of a fuel cell (not shown). The second end wall 26 defines a second opening or gas output port 32 for expelling from the separator 10 gas which has been separated from liquid water. The side wall 18 defines a third opening or water output port 34 for expelling from the separator 10 liquid water which has been separated from gas. Preferably, the water output port 34 is located adjacent to the second end wall 26.

The hydrophobic membrane 16 provided in the cavity 28 extends circumaxially about the axis A—A to define a gas passage 36 surrounded by the hydrophobic membrane 16, and is supported at a free end by the second end wall 26 of the housing 12 about a perimeter of the gas output port 32 such that the gas passage 36 communicates with the second opening 32, whereby gas passing through the hydrophobic membrane 16 is directed by the gas passage 36 toward and through the gas output port 32. Preferably, the hydrophobic membrane 16 is sealably coupled to the second end wall 26 by means of a first annular seal 33 to prevent liquid water from reaching the gas output port 32. The hydrophobic membrane 16 further extends in a longitudinal direction from the second end wall 26 and terminates at a closed end 38 adjacent to the first end wall 24 or input port 30. As shown in FIG. 1, the hydrophobic membrane 16 is interposed between the input port 30 and the gas output port 32 such that liquid water entering the input port 30 is blocked by the hydrophobic membrane 16 in order to prevent the liquid water from reaching and exiting the separator 10 through the gas output port 32.

The hydrophilic membrane 14 provided in the cavity 28 extends circumaxially about the hydrophobic membrane 16 and is coupled at one end to the first end wall 24 of the housing 12 about a perimeter of the first opening 30, and is coupled at an opposite end to the second end wall 26 about a perimeter of the second opening 32. Preferably, the hydrophilic membrane 14 is sealably coupled to the first and second end walls 24, 26 by means of respective second and third annular seals 25, 27. The hydrophilic membrane 14 is spaced inwardly from the cylindrical side wall 18 of the housing 12 such that a water passage 40 is defined by the hydrophilic membrane 14, the side wall 18 and the end walls 24, 26 for directing liquid water passing through the hydrophilic membrane 14 toward and through the water output port 34. As shown in FIG. 1, the hydrophilic membrane 14 is interposed between the input port 30 and the water output port 34 such that a gas component of the two-phase stream entering the separator 10 through the input port 30 is blocked by the hydrophilic membrane 14 in order to prevent the gas component from reaching and exiting the water output port 34.

In operation, the input port 30 of the separator 10 receives a commingled two-phase stream including liquid water and gas. For example, the input port 30 may be coupled to a reactant exhaust port of a fuel cell (not shown). The reactant exhaust may be either commingled process oxidant and liquid water issuing from an oxygen or air cathode exhaust port of the fuel cell, or may be commingled exhaust fuel and liquid water issuing from a fuel or anode exhaust port of the fuel cell. The two-phase stream enters the input port 30 of the separator 10 under a pressure defined as "P(gas+liquid water) in" at the input port 30, where P(gas+liquid) in>$P_{gas\ out}$ at the gas output port 32 >$P_{liquid\ out}$ at the water output port 34. The two-phase stream enters a portion of the cavity 28 bounded by the hydrophilic membrane 14, the hydrophobic membrane 16 and the first and second end walls 24, 26 of the housing 12.

As the two-phase stream enters the cavity 28 under pressure through the input port 30, the gas component impinges on the above-identified boundaries encountered in the cavity 28. The gas is prevented from passing through the end walls 24, 26 and the hydrophilic membrane 14, and is forced by a pressure difference between the input port 30 and the gas output port 32 through the remaining boundary of the cavity 28, namely, the hydrophobic membrane 16 which is pervious to gas and impervious to water. Once the gas component passes through the hydrophobic membrane 16, the gas is now separated from the liquid water component of the two-phase stream and is directed under a pressure of $P_{gas\ out}$ toward and through the gas output port 32.

The liquid water component of the two-phase stream entering the cavity 28 through the input port 30 also impinges on the boundaries encountered in the cavity 28 which include the hydrophilic membrane 14, the hydrophobic membrane 16 and the end walls 24, 26 of the housing 12. The liquid water is prevented from passing through the end walls 24, 26 and the hydrophobic membrane 16, and is forced by a pressure difference between the input port 30 and the water output port 34 and by means of capillary action through the remaining boundary of the cavity 28, namely, the hydrophilic membrane 14 which is pervious to liquid water. The capillary action requirement for passing a component through the hydrophilic membrane 14 renders the same impervious to gas. Once the liquid water component of the two-phase stream passes through the hydrophilic membrane 14, the liquid water component of the two-phase stream is now separated from the gas component and is directed under a pressure of $P_{liquid\ out}$ toward and through the water output port 34.

Although this invention has been shown and described with respect to an exemplary embodiment thereof, it should be understood by those skilled in the art that the foregoing and various other changes, omissions, and additions in the form and detail thereof may be made therein without departing from the spirit and scope of the invention.

What is claimed is:

1. A water separator for separating a two-phase stream into a liquid water component and a gas component, the water separator comprising:

a housing defining a cavity and including an input port, a gas output port and a water output port, the housing having a substantially cylindrical shape including a cylindrical side wall, and first and second end walls, the first end wall being provided at one end of the side wall and defining the input port, the second end wall being provided at an opposing end of the side wall and defining the gas output port, and the side wall defining the water output port;

a hydrophobic filter provided in the cavity and interposed between the input port and the gas output port so as to prevent a liquid water component of a two-phase stream of gas and water entering the input port from exiting the gas output port, the hydrophobic filter permitting a gas component of the two-phase stream to be forced therethrough by means of a pressure difference thereacross and to exit the water separator via the gas output port; and a hydrophilic filter provided in the cavity and interposed between the input port and the water output port so as to prevent the gas component entering the input port from exiting the water output port, the hydrophilic filter permitting a water component of the two-phase stream to be forced therethrough by means of a pressure difference thereacross and capillary action therein and to exit the water separator via the water output port.

2. A water separator as defined in claim 1, wherein the hydrophobic filter extends circumaxially about a central longitudinal axis of the housing, and extends in a longitudinal direction from the second end wall and terminates at a closed end adjacent to the other end wall, the hydrophobic filter being coupled at a free end to the second end wall about a perimeter of the gas output port.

3. A water separator as defined in claim 1, wherein the hydrophilic filter extends circumaxially about the hydrophobic filter, and has a first end coupled to the first end wall and a second end coupled to the second end wall.

4. A water separator as defined in claim 1, wherein the hydrophobic filter is a hydrophobic membrane.

5. A water separator as defined in claim 1, wherein the hydrophilic filter is a hydrophilic membrane.

6. A water separator as defined in claim 2, further including a seal member for sealably coupling the free end of the hydrophobic filter to the second end wall.

7. A water separator as defined in claim 3, further including first and second seal members for sealably coupling the first and second ends of the hydrophilic filter respectively to the first and second end walls.

8. A water separator for separating a two-phase stream into a liquid water component and a gas component, the water separator comprising:

a housing defining a cavity and including an input port, a gas output port and a water output port, the housing including a side wall, and first and second end walls, the first end wall being provided at one end of the side wall and defining the input port, the second end wall being provided at an opposing end of the side wall and defining the gas output port, and the side wall defining the water output port;

a hydrophobic filter provided in the cavity and interposed between the input port and the gas output port so as to prevent a liquid water component of a two-phase stream of gas and water entering the input port from exiting the gas output port, the hydrophobic filter permitting a gas component of the two-phase stream to be forced therethrough by means of a pressure difference thereacross and to exit the water separator via the gas output port; and a hydrophilic filter provided in the cavity and interposed between the input port and the water output port so as to prevent the gas component entering the input port from exiting the water output port, the hydrophilic filter permitting a water component of the two-phase stream to be forced therethrough by means of a pressure difference thereacross and capillary action therein and to exit the water separator via the water output port.

9. A water separator as defined in claim 8, wherein the housing has a substantially cylindrical shape including a cylindrical side wall.

10. A water separator as defined in claim 8, wherein the hydrophobic filter extends circumaxially about a central longitudinal axis of the housing, and extends in a longitudinal direction from the second end wall and terminates at a closed end adjacent to the other end wall, the hydrophobic filter being coupled at a free end to the second end wall about a perimeter of the gas output port.

11. A water separator as defined in claim 8, wherein the hydrophilic filter extends circumaxially about the hydrophobic filter, and has a first end coupled to the first end wall and a second end coupled to the second end wall.

12. A water separator as defined in claim 8, wherein the hydrophobic filter is a hydrophobic membrane.

13. A water separator as defined in claim 8, wherein the hydrophilic filter is a hydrophilic membrane.

14. A water separator as defined in claim 10, further including a seal member for sealably coupling the free end of the hydrophobic filter to the second end wall.

15. A water separator as defined in claim 11, further including first and second seal members for sealably coupling the first and second ends of the hydrophilic filter respectively to the first and second end walls.

* * * * *